(12) United States Patent
Chen et al.

(10) Patent No.: US 8,729,879 B2
(45) Date of Patent: May 20, 2014

(54) DEVICE OF INDUCTANCE DETECTION AND THE METHOD USING THE SAME

(75) Inventors: Shih-Chieh Chen, HsinChu (TW);
Jian-Ru Lin, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 76 days.

(21) Appl. No.: 13/411,267

(22) Filed: Mar. 2, 2012

(65) Prior Publication Data
US 2012/0223689 A1    Sep. 6, 2012

(30) Foreign Application Priority Data
Mar. 4, 2011    (TW) .............................. 100107375 A

(51) Int. Cl.
*H02M 3/156*    (2006.01)

(52) U.S. Cl.
USPC ............................ 323/284; 323/283; 323/351

(58) Field of Classification Search
CPC ................ H02M 3/156; H02M 3/157; H02M 2001/0025
USPC .......................................... 323/282–285, 351
See application file for complete search history.

(56) References Cited

U.S. PATENT DOCUMENTS

| 4,131,848 | A | * | 12/1978 | Battle | 324/236 |
| 2008/0247199 | A1 | * | 10/2008 | Djenguerian et al. | 363/50 |
| 2010/0289469 | A1 | * | 11/2010 | Vanderzon | 323/282 |

* cited by examiner

*Primary Examiner* — Gary L Laxton
*Assistant Examiner* — Kyle J Moody
(74) *Attorney, Agent, or Firm* — Muncy, Geissler, Olds & Lowe, P.C.

(57) ABSTRACT

A device of inductance detection, which includes: a controller, a current pulse generator, and a detector. The controller generates a control signal and an enable signal to the switching regulator according to a judge signal. The switching regulator then generates an output voltage. The current pulse generator is coupled to the controller and generates a current pulse signal to the object according to the control signal. The detector is coupled to the object and the current pulse generator, and is used to detect a reflective signal responded by the object after the object receives the current pulse signal. The detector then generates a judge signal according to the reflective signal.

10 Claims, 10 Drawing Sheets

DEVICE OF INDUCTANCE DETECTION AND THE METHOD USING THE SAME

CROSS-REFERENCES TO RELATED APPLICATIONS

This non-provisional application claims priority under 35 U.S.C. §119(a) on Patent Application No. 100107375 filed in Taiwan, R.O.C. on 2011 Mar. 4, the entire contents of which are hereby incorporated by reference.

BACKGROUND

1. Technical Field

The disclosure relates to an inductor, and more particularly, to a device of inductance detection and the method using the same.

2. Related Art

Recently, portable electronic products have developed and used in a wide range of fields, and have encountered a power management issue. Due to the electric power limitations of portable electronics products, power management IC has become a key component for effectively managing electric power consumption. Power management IC transforms a voltage of the battery to the different operation voltages of the sub-circuits of the portable electronics product, such as transforming 3.3V to 1.2V, or 3.3V to 2.5V, etc. The design guide of the voltage transforming for the power management IC is high efficiency, high precision, low noise, and small volume. Generally speaking, there are three kinds of voltage transformer inside the power management IC: switching regulator, linear regulator, and charge pump regulator.

The switching regulator is a high efficient voltage transformer, and theoretically, it could have 100% transforming efficiency. Nowadays, the outside voltage supplied usually is a single voltage level; conversely, the electric system uses a multi-voltage providing system for different voltage level requirement, through a embedded multi-voltage switching regulator, to provide multi-level voltages to the system. Otherwise, a high efficient switching regulator is a popular choice since it reduces power consumption.

Please refer to FIG. 1, which depicts the inside architecture of a conventional switching regulator, adopting a PWM (Pulse Width Modulation) control signal to control a transistor to transmit an output voltage (Vout) with a high frequency noise to an outside inductor and capacitor. After a low pass filter composed by the outside inductor and capacitor filters the high frequency noise, a stable fixed voltage without noise is outputted to the load. Usually, the switching regulator uses the outside inductor and capacitor for filtering when the power is transformed.

There are several problems for conventional switching regulator when using the outside inductor and capacitor:
1. The passive components are made smaller than ever, causing a problem of the similarity of each component. When bonding the tiny inductor on the output end of the switching regulator, if a resistor was wrongly chosen and bonded, the switching regulator may malfunction due to misuse.
2. If the impedance of the outside inductor is inappropriate, the switching regulator would be damaged due to the over voltage. The conventional switching regulator design does not provide an appropriate protection mechanism for this situation.

There is therefore a need to provide an active checking mechanism for the correctness of the outside component of the switching regulator, to prevent potential damage caused by misusing the outside component.

SUMMARY

A device of inductance detection includes: a controller, a current pulse generator, and a detector. The controller generates a control signal and an enable signal to the switching regulator according to a judge signal. The switching regulator then generates an output voltage. The current pulse generator is coupled to the controller and generates a current pulse signal to the object according to the control signal. The detector is coupled to the object and the current pulse generator, and is used to detect a reflective signal responded by the object after the object receives the current pulse signal. The detector then generates a judge signal according to the reflective signal.

A method for inductance detection includes generating a control signal; generating a current pulse signal to an object according to the control signal; detecting a reflective signal generated from the object, and calculating the reflective signal to generate a judge signal; and enabling a switching regulator to generate an output voltage based on the judge signal.

In order to make the aforementioned and other objectives, features and advantages of the disclosure comprehensible, preferred embodiments accompanied with figures are described in detail below.

BRIEF DESCRIPTION OF THE DRAWINGS

The disclosure will become more filly understood from the detailed description given herein below for illustration only, and thus not limitative of the present invention, wherein.

DETAILED DESCRIPTION

The inductor has a feature that expresses difference impedance under different frequency, that is, frequency response. However, the resistor does not have the feature of frequency response, and has the same impedance under all frequencies. The disclosure applies the feature of different frequency response of the inductor and resistor to judge if the outside component was used appropriately. Specifically, the disclosure utilizes a frequency signal to output to the output component of the switching regulator, then analyzes if the component is an inductor or resistor within the correct range or incorrect range according to the frequency response of the outside component.

Figure 1:
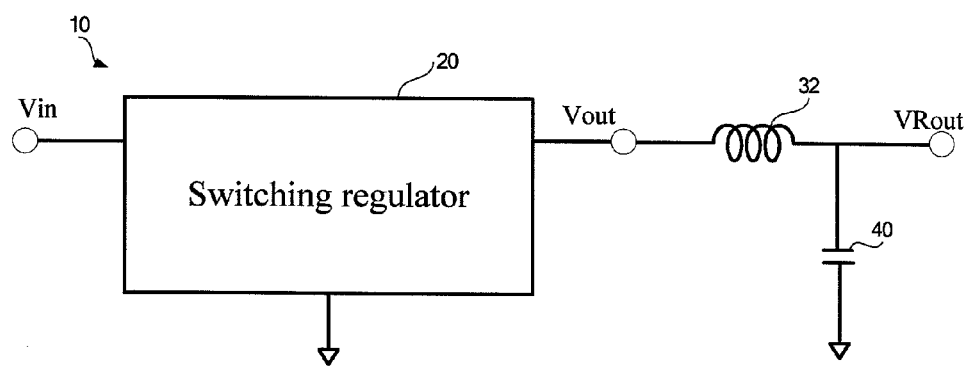
FIG. 1 is a conventional circuit diagram of the switching regulator.
Figure 2:
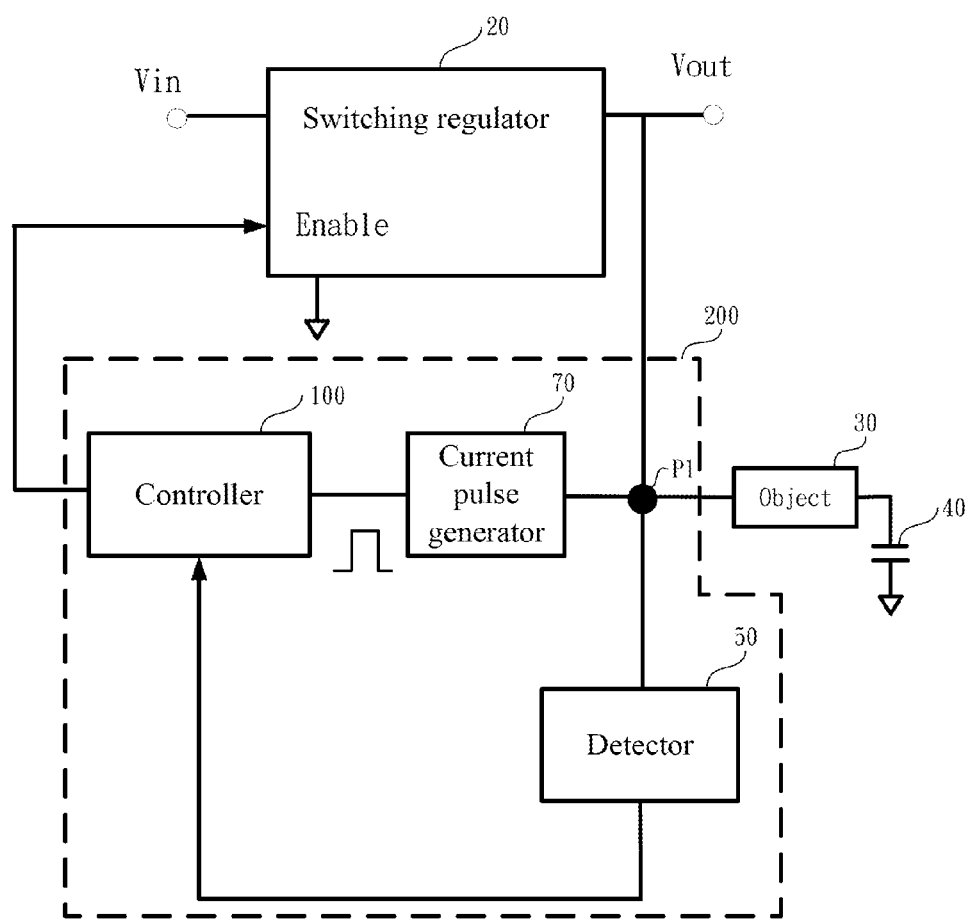
FIG. 2 is a diagram of the device of inductance detection according to an embodiment of the disclosure.

Please refer to FIG. 2, in which the device of inductance detection 200 includes a controller 100, a current pulse generator 70, and a detector 50. The controller 100 generates a control signal and an enable signal to the switching regulator 20 according to a judge signal. The switching regulator 20 then generates an output voltage. The current pulse generator 70 is coupled to the controller 100, and generates a current pulse signal to the object 30 according to the control signal. The detector 50 is coupled to the object 30 and the current pulse generator 70, and is used to detect a reflective signal responded by the object 30 after the object 30 receives the current pulse signal. The detector 40 then generates a judge signal according to the reflective signal. The object 30 is coupled between the current pulse generator 70 and the switching regulator 20, and responds to generate the reflective signal after receiving the current pulse signal.

The controller 100 controls the system operation, which is starting from continuously generating at least one step signal to the current pulse generator 70. The current pulse generator 70 is a combination of a fix current source and a transistor, which is used as a switch. When the controller 100 sends the control signal to the current pulse generator 70, the current pulse generator 70 respectively generates a current pulse to the object 30. The object 30 would then respond to a reflective signal. The detector 50 would detect the reflective signal and determine whether the reflective signal is generated by an inductor or a resistor. If the reflective signal meets the inductor requirement, and the inductance impedance is between a range defined by a preset inductor impedance range of the outside inductor of the switching regulator, the detector 50 generates a judge signal appropriate to this result. After receiving the judge signal, the controller 100 generates the enable signal to the switching regulator 20. After the switching regulator 20 receives the enable signal, it generates the output voltage. Otherwise, if the switching regulator 20 did not receive the enable signal, it does not generate the output voltage (disable).

Figure 3:
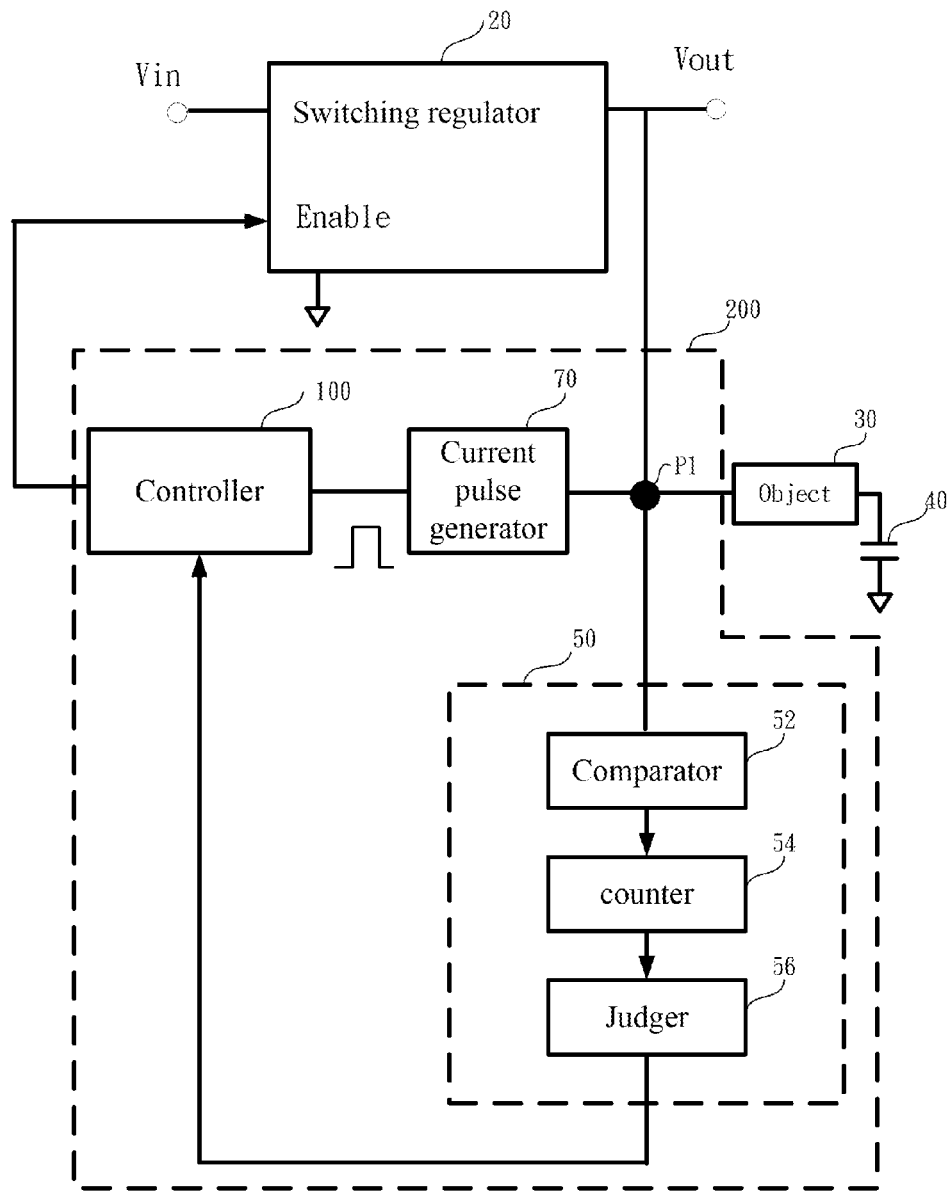
FIG. 3 is a detector diagram of the device of inductance detection according to a first embodiment of the disclosure.

Please refer to FIG. 3, in which the device of inductance detection 200 includes the detector 50. The detector 50 includes a comparator 52, a counter 54, and a judger 56. The counter 54 generates a counting value based on counting a clock number. The comparator 52 is coupled to the current pulse generator 70 and the object 30, and has an upper limit Range 1 and a lower limit Range 2. The counter 54 generates the counting value when the strength of the reflective signal is within the upper limit Range 1 and the lower limit Range 2. The judger 56 is coupled to the counter 54 and the controller 100, is used to receive the counting value to make a judgment, and if the counting value exceeds a preset counting value, generates the judge signal.

Usually the comparator 52 is designed by an operational amplifier (OPA). For example, comparator 52 is composed of two OPAs, one of which has the upper limit Range 1, and the other has the lower limit Range 2. A comparative signal is calculated when the reflective signal is compared with the upper limit Range 1 and the lower limit Range 2. Please note that the comparator 52 architecture using OPA is only one example of the disclosure but not a limitation of the disclosure, other architecture for the comparator 52 could be used for the disclosure.

Figure 4:
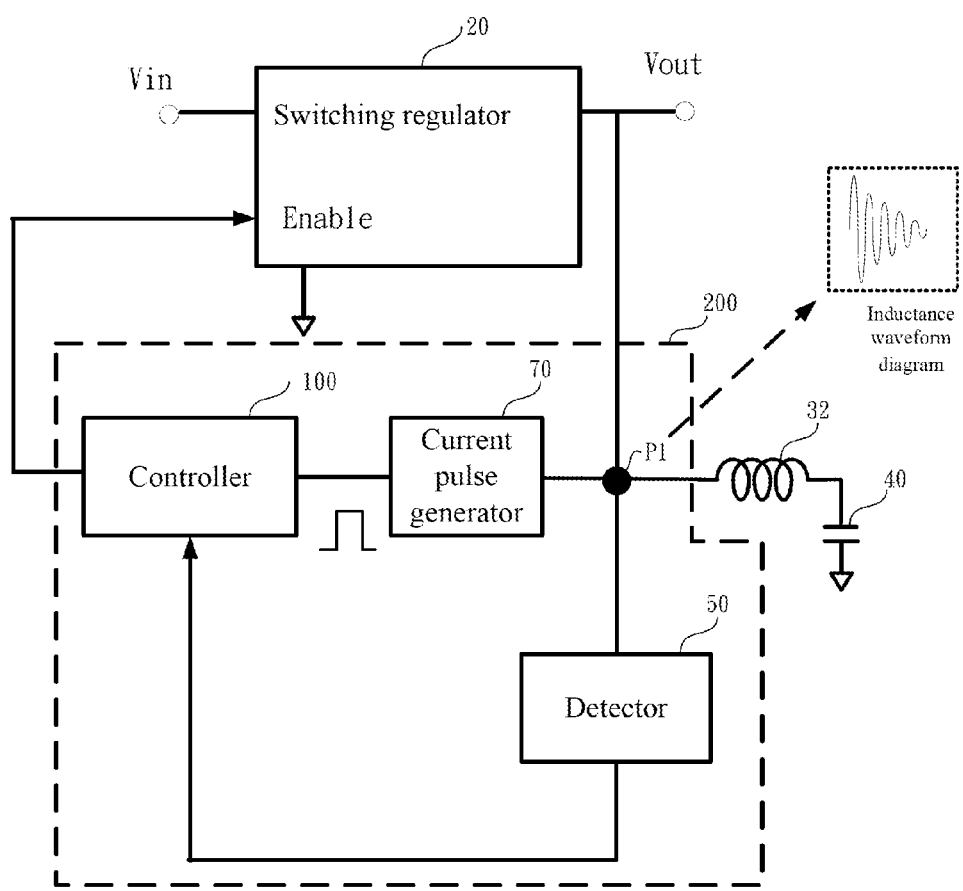
FIG. 4 is a diagram of the outside inductor of the device of inductance detection. according to the disclosure.

Please refer to FIG. 4, in which an outside inductor has inductance L ranging from 2.2 uH to 4.7 uH, and the impedance of WL, where W is a frequency of the current pulse signal. The comparator 52 sets the upper limit Range 1 and the lower limit Range 2, and the comparator 52 receives the reflective signal X and generates the comparative signal COMP according to the upper limit Range 1 and the lower limit Range 2. The formulas of the comparator are as follows:

If ($X$>Range1 and $X$>Range2)

COMP=0;  F.1

Else If ($X$<Range1 and $X$>Range2)

COMP=1;  F.2

Else If ($X$<Range2)

COMP=0;  F.3

Three examples are used here to explain how to use these formulas:

Ex.1

Figure 5:
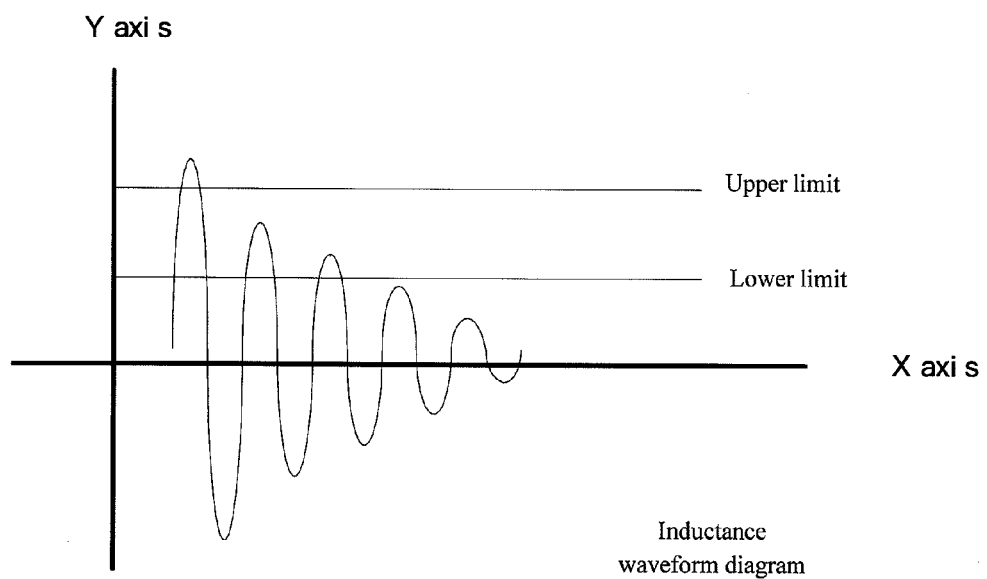
FIG. 5 is a schematic view of a waveform of an outside inductor according to a first embodiment of the disclosure.

Please refer to FIG. 5, in which the event indicated in FIG. 5 takes place after the controller 100 transmits a step signal, when the outside component is an inductor and the impedance of the inductor is too large. In FIG. 5, the current pulse generator 70 sends the current pulse signal to the object 30. When the reflective signal responded by the object 30 is too large and exceeds the scope defined by the upper limit Range 1 and the lower limit Range 2, the reflective signal is calculated through F.1, and the comparative signal is determined to be "0". The counter 54 will not count when the comparative signal is "0". Practically, a preset counting value is set for the system; for example, 50. The controller 100 transmits the step signal 100 times to the current pulse generator 70, then the detector 50 judges the reflective signal responded by the object 30, through the comparator 52. If the result fits F.1, the counter 54 does not count. If the result fits F.2, the counter 54 starts to count. If the result fits F.3, the counter 54 does not count. For example, when the impedance of the inductor is too large, the counting value is 20 after 100 times step signal test, the judger 56 would determine the counting is 20 and it does not exceed the preset counting value of 50. In this case, the judger 56 would not send the judge signal to the controller 100. If the controller 100 does not receive the judge signal, the enable signal would not be transmitted to the switching regulator 20. Consequently, the switching regulator 20 is disabled, and it would not generate any output voltage.

Ex.2

Figure 6:
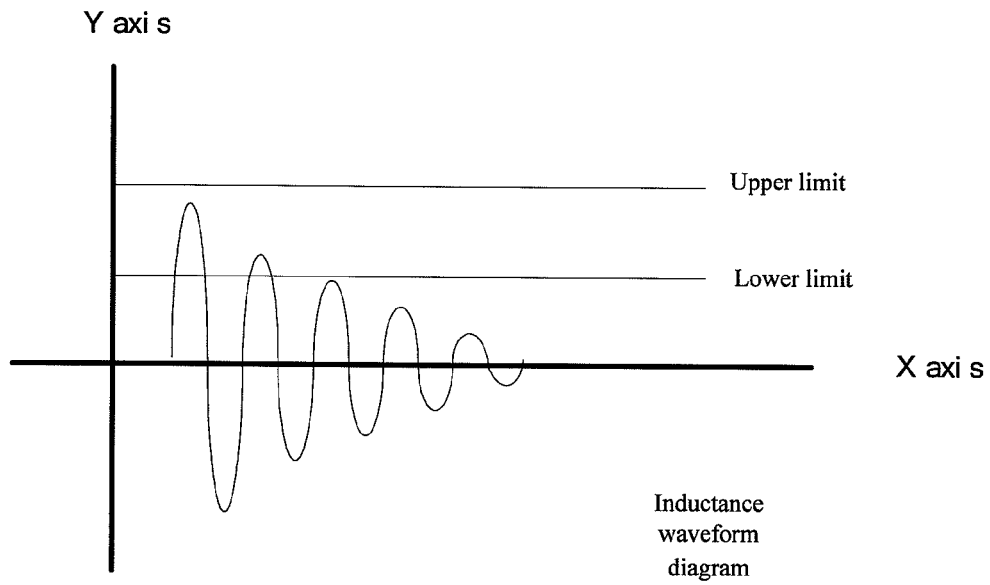
FIG. 6 is a schematic view of a waveform of an outside inductor according to a second embodiment of the disclosure.

Please refer to FIG. 6, in which the outside component is an inductor, and the impedance of the inductor is appropriate, and after the controller 100 transmits a step signal, the result is as FIG. 6. The current pulse generator 70 sends a current pulse signal to the object 30. The object 30 responds with a damping reflective signal and the damping scope is smaller than the upper limit Range 1 but is larger than the lower limit Range 2. The comparative signal would be calculated and judged as "1" through F.2. The counter 54 starts to count when the comparative signal is "1".

Practically, a preset counting value is set for the system, for example, 50. The controller 100 transmits the step signal 100 times to the current pulse generator 70, then the detector 50 judges the reflective signal responded by object 30 through comparator 52. If the result fits F.1, the counter 54 does not count. If the result fits F.2, the counter 54 starts to count. If the result fits F.3, the counter 54 does not count. For example, when the impedance of the inductor is appropriate, the counting value is 90 after 100 times the step signal test, and the judger 56 will determine the counting is 90, and it exceeds the preset counting value of 50. In this case, the judger 56 would send the judge signal to the controller 100. If the controller 100 received the judge signal, the enable signal would be transmitted to the switching regulator 20. Consequently, the switching regulator 20 is enabled, and generates the output voltage.

Ex.3

Figure 7:
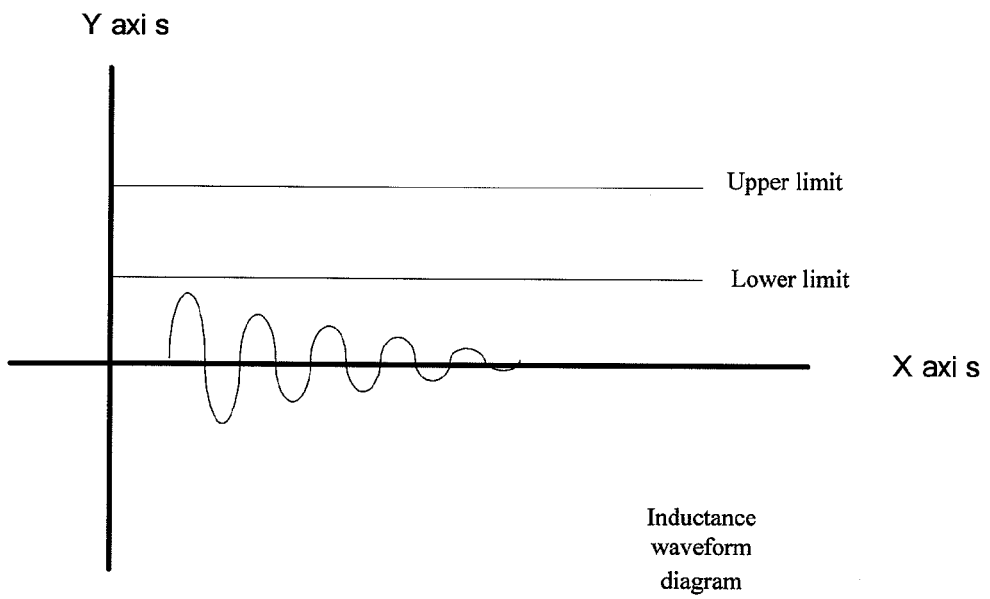
FIG. 7 is a schematic view of a waveform of an outside inductor according to a third embodiment of the disclosure.

Please refer to FIG. 7, in which the outside component is an inductor, and the impedance of the inductor is too small; after the controller 100 transmits a step signal, the result is as FIG. 7. The current pulse generator 70 sends a current pulse signal to the object 30, then the object 30 responds with a reflective signal. If the damped reflective signal is too large and exceeds the upper limit Range 1 and the lower limit Range 2, the comparative signal is calculated and determined to be "0" through F.3. The counter 54 will not count when the comparative signal is "0".

Practically, a preset counting value is set for the system, for example, 50. The controller 100 transmits the step signal 100 times to the current pulse generator 70, then the detector 50 judges the reflective signal responded to by the object 30 through the comparator 52. If the result fits F.1, the counter 54 does not count. If the result fits F.2, the counter 54 starts to count. If the result fits F.3, the counter 54 does not count. For example, when the impedance of the inductor is too small, the counting value is 5 after 100 times the step signal. test, the judger 56 would determine the counting is 5, which does not exceed the preset counting value of 50. In this case, the judger 56 would not send the judge signal to the controller 100. If the controller 100 does not receive the judge signal, the enable signal would not be transmitted to the switching regulator 20. Therefore, the switching regulator 20 is disabled, and will not generate any output voltage.

Please notice that these formulas are only examples, and do not limit the disclosure. The parameters and the values could be chosen and changed for different systems.

Figure 8:
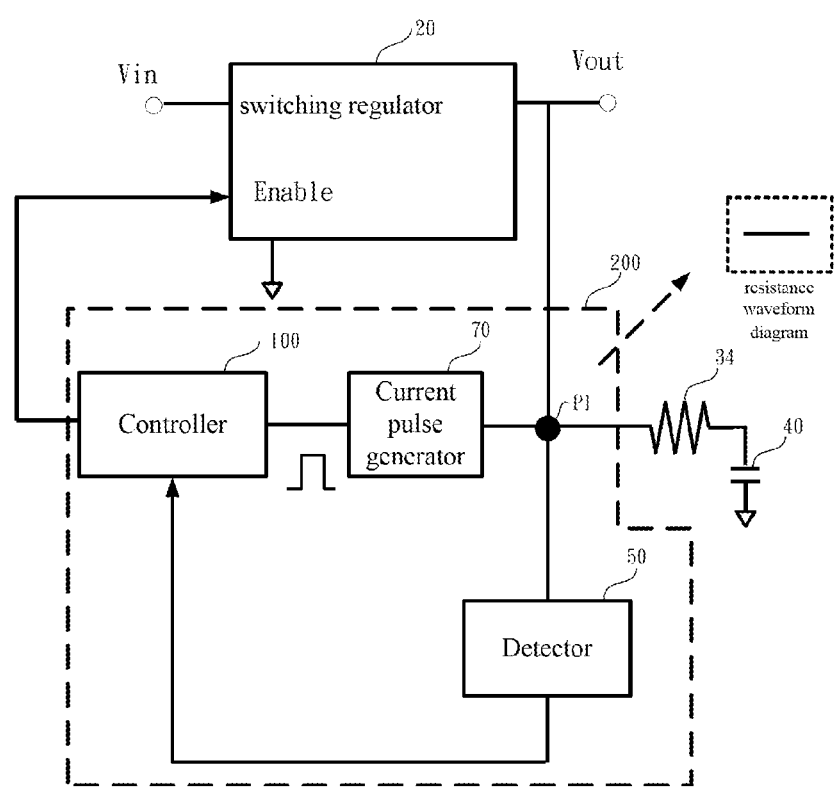
FIG. 8 is a diagram of the outside resistor of the device of inductance detection according to the disclosure.

Please refer to FIG. 8, which is a diagram of an embodiment of outside resistor of the device of inductance detection. Under the different frequencies, the resistor 34 maintains the same impedance regardless of the frequency of the inputted current pulse signal. The resistive response waveform is as shown in FIG. 9.

Figure 9:
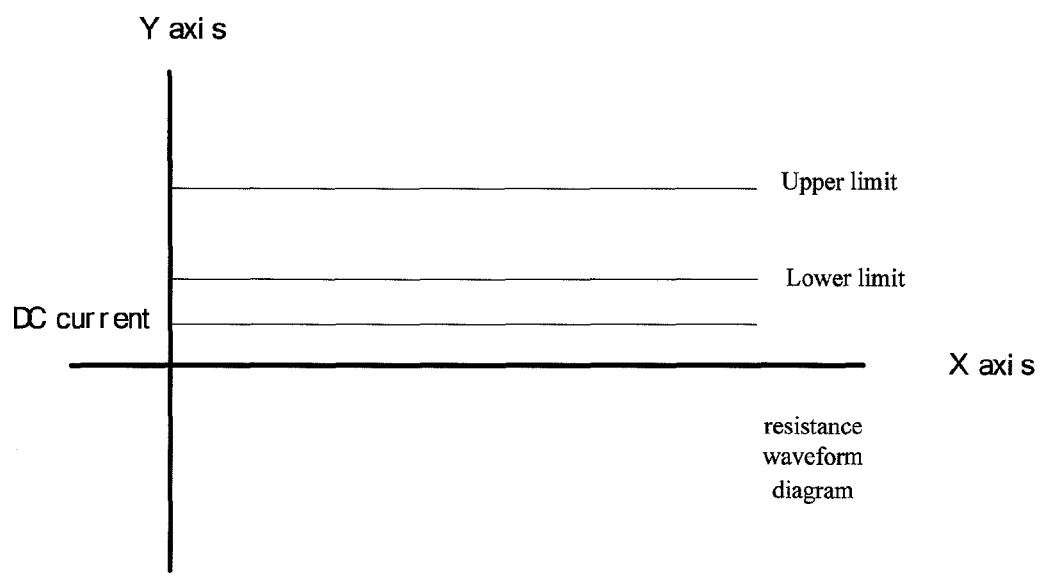
FIG. 9 is a schematic view of a waveform of an outside resistor according to a first embodiment of the disclosure.

Please refer to FIG. 9, in which the outside component is a resistor, and when the controller 100 transmits a step signal, the current pulse generator 70 generates the current pulse signal to the object 30 after receiving the step signal. The object 30 is a resistor, so the response of the current pulse signal of the object 30 is a fixed voltage. Since the fixed voltage does not exceed the upper limit Range 1 and the lower limit Range 2, the comparative signal is calculated and judged as "0" through F.3. The counter 54 will not count when the comparative signal is "0".

Practically, a preset counting value is set for the system; for example, 50. The controller 100 transmits the step signal 100 times to the current pulse generator 70, then the detector 50 judges the reflective signal responded by the object 30 through the comparator 52. The outside component is a resistor, and the reflective signal responded by the object 30 is compared by the comparator 52. The comparator 52 generates the comparative signal as "0". In this case, the counting value is 0 after 100 instances of the step signal tests, and the judger 56 would judge the counting is 0 and it exceeds the preset counting value of 50. In this case, the judger 56 will not send the judge signal to the controller 100. If the controller 100 does not receive the judge signal, the enable signal will not be transmitted to the switching regulator 20. Consequently, the switching regulator 20 is disabled, and will not generate any output voltage.

Please note that when the outside component is an inductor, the response waveform is as shown in FIG. 5, FIG. 6 or FIG. 7; otherwise, when the outside component is a resistor, the response waveform is FIG. 9. That is to say, through a different response waveform of the outside component, the object 30 (the outside component) is identified as an inductor or resistor. If the outside component is an inductor, an appropriate inductance range is identified by the comparator 52 according to the embedded upper limit Range 1 and the lower limit Range 2. For example, through comparing the response waveform with FIG. 5, FIG. 6 or FIG. 7, the appropriate inductance of the outside component is judged when the response waveform fits FIG. 6. If the inductance does not fit the appropriate range, the switching regulator 20 is disabled. The switching regulator 20 will thus not be destroyed by misuse of the outside component.

Figure 10:
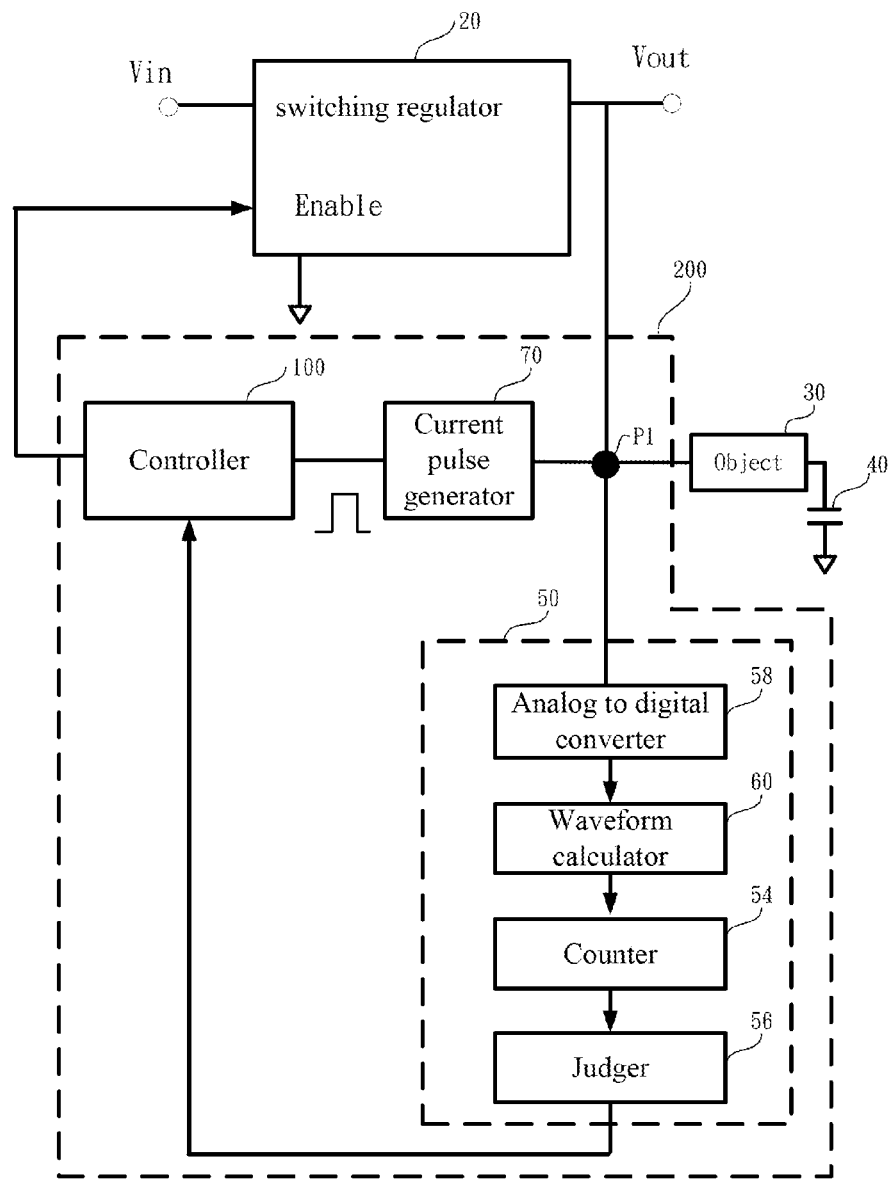
FIG. 10 is a detector diagram of the device of inductance detection according to a second embodiment of the disclosure.

Now please refer to FIG. 10, in which the detector 50 includes an analog to digital converter 58, a waveform calculator 60, a counter 54, and a judger 56. The analog to digital converter 58 receives the reflective signal and transforms it into a digital signal. The counter 54 generates a counting value. The waveform calculator 60 is coupled to the analog to digital converter 58, and has an upper limit and a lower limit. The waveform calculator 60 generates a comparative signal through comparison of the response waveform of the digital signal, according to the upper limit and the lower limit. The judger 56 is coupled to the counter 54 and the controller 100, and is used for receiving the counting value and generating the judge signal when the counting value exceeds a preset counting value.

The analog to digital converter 58 transforms the inputted analog signal into the digital signal. The digital signal is transmitted to the waveform calculator 60 to analyze the reflective waveform. A preset upper limit Range 1 and lower limit Range 2 are set for the system, and the waveform calculator 60 uses the setting to analyze the digital signal in order to generate the comparative signal.

When the analyzing result generated by the waveform calculator 60 is between the upper limit Range 1 and the lower limit Range 2, the comparative signal is set to "1", and the counter 54 starts to count. Otherwise, when the analyzing result generated by the waveform calculator 60 is larger than the upper limit Range 1 and exceeds the lower limit Range 2, is or smaller than the lower limit Range 2, the comparative signal is set to "0", and the counter 54 stop counting.

Please note that the detector 50 architecture described previously is used for example only, and does not limit the disclosure. The architecture could be modified according to different system applications.

Figure 11:
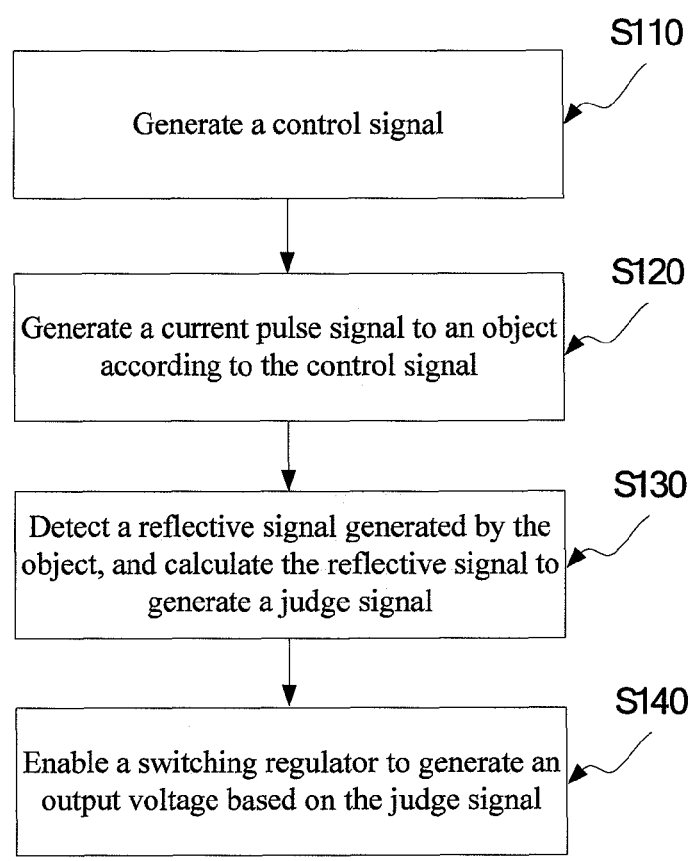
FIG. 11 is a flow chart of the method of inductance detection according to the disclosure.

Please refer to FIG. 11, which is a flow chart of the inductance detection of the disclosure, and includes the following steps:

In step 110: generating a control signal.

In step 120: sending a current pulse signal to an object according to the control signal.

In step 130: detecting a reflective signal generated by the object, and calculating the reflective signal to generate a judge signal.

In step 140: enabling a switching regulator to generate an output voltage based on the judge signal.

The control signal is at least one step signal; for example, 100 step signals could be sent to the object 30.

Furthermore, the method further includes the steps of: generating a counting value when the reflective signal is between an upper limit and a lower limit; and generating the judge signal when the counting value exceeds a preset counting value.

Additionally, the method further includes the steps of: converting the reflective signal to a digital signal; generating a counting value when the digital signal is between an upper limit and a lower limit; and generating the judge signal when the counting value exceeds a preset counting value.

Please notice that the disclosure provides a better device and method to achieve the following advantages:

1. Inductor Protection.

The passive components are smaller than ever, causing a problem of similarity of passive components. If a resistor bonds on the inductor bonding part of the switching regulator, the switching regulator may be damaged due to misuse of the resistor. Through the new protection mechanism of the disclosure, the misuse of the outside component of the switching regulator can be checked, and the switching regulator is disabled and protected in this situation.

2. Over Voltage Protection

When the inductance of the outside inductor is too large, the switching regulator will face an over voltage situation, and may be damaged. Through the new protection mechanism of the disclosure, the danger of over voltage could be checked by distinguishing the inappropriate inductance range of the outside component of the switching regulator; the switching regulator would be disabled and protected in this situation.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A device of inductance detection, coupled to an object to be detected and a switching regulator, the device comprising:
    a current pulse generator, generating a current pulse signal to the object according to a control signal;
    a detector, coupled to the object and the current pulse generator, for detecting a reflective signal responded by the object after receiving the current pulse signal, determining whether the reflective signal meets at least one inductor requirement, and when the reflective signal meets the at least one inductor requirement, generating a judge signal according to the reflective signal, wherein the at least one inductor requirement comprises determining whether an inductance impedance is between a range defined by a preset inductor impedance range of an outside inductor of the switching regulator or not, and if the inductance impedance is not between the defined range, the at least one inductor requirement is not met; and
    a controller, coupled to the detector and the current pulse generator, for generating the control signal, and generating an enable signal used for enabling the switching regulator to generate an output voltage based on the judge signal.

2. The device of inductance detection according to claim 1, wherein the control signal is at least one step signal.

3. The device of inductance detection according to claim 1, wherein the detector comprises:
    a counter, for generating a counting value;
    a comparator, coupled to the current pulse generator and the object, having an upper limit and a lower limit, and enabling the counter to generate the counting value when the reflective signal is between the upper limit and the lower limit; and
    a judger, coupled to the counter and the controller, for receiving the counting value, and generating the judge signal when the counting value exceeds a preset counting value.

4. The device of inductance detection according to claim 1, wherein the detector comprises:
    a counter, for generating a counting value;
    an analog to digital converter, for receiving the reflective signal, and transforming into a digital signal;
    a waveform calculator, coupled to the analog to digital converter, having an upper limit and a lower limit, and enabling the counter to generate the counting value when the reflective signal is between the upper limit and the lower limit; and
    a judger, coupled to the counter and the controller, for receiving the counting value, and generating the judge signal when the counting value exceeds a preset counting value.

5. The device of inductance detection according to claim 1, wherein the controller disables the output voltage outputted by the switching regulator when the controller does not receive the judge signal.

6. A method for inductance detection, comprising:
    generating a control signal;
    generating a current pulse signal to an object according to the control signal;
    detecting a reflective signal generated from the object;
    determining whether the reflective signal meets at least one inductor requirement based on a calculation using the detected reflective signal generated from the object;
    when the reflective signal meets the inductor requirement, generating a judge signal; and
    enabling a switching regulator to generate an output voltage based on the judge signal;
    wherein the determining step comprises: determining whether an inductance impedance is between a range defined by a preset inductor impedance range of an outside inductor of the switching regulator or not; and if the inductance impedance is not between the defined range, the inductor requirement is not met.

7. The method of inductance detection according to claim 6, wherein the control signal is at least one step signal.

8. The method of inductance detection according to claim 6, further comprising: generating a counting value when the reflective signal is between an upper limit and a lower limit; and generating the judge signal when the counting value exceeds a preset counting value.

9. The method of inductance detection according to claim 6, further comprising: converting the reflective signal to a digital signal; generating a counting value when the digital signal is between an upper limit and a lower limit; and generating the judge signal when the counting value exceeds a preset counting value.

10. The method of inductance detection according to claim 6, further comprising: disabling the output voltage outputted by the switching regulator when the judge signal is not generated.

* * * * *